United States Patent [19]

Wike, Jr. et al.

[11] Patent Number: 5,185,514
[45] Date of Patent: Feb. 9, 1993

[54] PROGRAMMABLE APPARATUS AND METHOD FOR OPTICAL SCANNERS

[75] Inventors: Charles K. Wike, Jr., Cambridge, Ohio; Donald A. Collins, Jr., Ithaca; Craig E. Maddox, Trumansburg, both of N.Y.

[73] Assignee: NCR Corporation, Dayton, Ohio

[21] Appl. No.: 762,702

[22] Filed: Sep. 19, 1991

[51] Int. Cl.⁵ .............................. G06K 7/10
[52] U.S. Cl. .................. 235/375; 235/454; 235/462; 235/470; 235/472
[58] Field of Search ........... 235/375, 454, 462, 470, 235/472; 359/450, 454

[56] References Cited

U.S. PATENT DOCUMENTS

| | | | |
|---|---|---|---|
| 4,423,319 | 12/1983 | Jacobsen | 235/472 |
| 4,868,375 | 9/1989 | Blanford | 235/462 |
| 4,971,410 | 11/1990 | Wike, Jr. et al. | 350/6.5 |
| 5,015,832 | 5/1991 | Filipski et al. | 235/462 |
| 5,105,070 | 4/1992 | Wike, Jr. et al. | 235/470 |
| 5,132,523 | 7/1992 | Bassett | 235/462 |

Primary Examiner—William L. Sikes
Assistant Examiner—Scott A. Ouellette
Attorney, Agent, or Firm—Paul W. Martin

[57] ABSTRACT

A programming apparatus and method for optical scanners which employs bar code labels to convert one optical scanner into a mentor scanner and another optical scanner into a student scanner. A lightweight housing made of opaque plastic has a center portion and first and second end portions, the center portion containing a cavity, and the first and second end portions containing apertures therethrough and into the cavity. Within the cavity, two parallel diffusion screens are separated by a distance sufficient to convert a light beam from the mentor scanner into a plurality of point sources of light for reception and detection by the student scanner. Sockets within the end portions position the scanners and seal out ambient light.

29 Claims, 3 Drawing Sheets

PROGRAMMABLE APPARATUS AND METHOD FOR OPTICAL SCANNERS

BACKGROUND OF THE INVENTION

The present invention relates to optical scanners and more specifically to a programming apparatus and method for optical scanners.

Optical scanners are well known for their usefulness in retail check out and inventory control. They generally employ a laser for generating a scanning beam. An optical transceiver includes a deflecting mirror, which deflects the laser light beam against a plurality of stationary mirrors, and a collection portion, which collects the reflected light beam from the coded indicia. A motor rotates the optical transceiver, and a detector receives the returning light beam. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

Scanner programmability is now an accepted and popular feature on most optical scanners. Optical scanners may be programmed to cause any suitable function, including code type, communication mode, and baud rate to be alternated in response to the reading of a given function character. Even speaker tone may be adjusted. This programming is accomplished by scanning special bar code labels corresponding to a desired firmware configuration. An example of such programming methods can be found in commonly assigned U.S. Pat. No. 4,868,375, entitled, "Method for Changing Functions of a Bar Code Reader", issued Sep. 19, 1989, to Blanford. This patent is hereby incorporated by reference.

The method disclosed by Blanford works well for programming individual scanners. However, it would also be desirable to use a scanner to program any number of scanners.

SUMMARY OF THE INVENTION

In accordance with the teachings of the present invention, a programming apparatus and method for optical scanners is provided. The programming apparatus employs a housing having a center portion and first and second end portions, the center portion containing a cavity defined by an interior surface of the center portion, the first and second end portions containing apertures therethrough and into the cavity and defined by an interior surface of the end portions. In the preferred embodiment, the housing is made of a lightweight opaque plastic. One optical scanner is placed adjacent the first end portion and another optical scanner is placed adjacent the second end portion.

The programming apparatus employs program labels mounted on glass sheets within the apertures to convert the one optical scanner into a mentor scanner by deactivating its motor, and to convert the other optical scanner into a student scanner by deactivating its laser and motor. In the preferred embodiment, the programming labels are bar code labels.

The programming apparatus employs a feature which advantageously obviates the need to synchronize the positions of the optical transceivers within the scanners. In the preferred embodiment, two parallel diffusion screens are separated by a distance sufficient to convert a light beam from the mentor scanner into a plurality of point sources of light which illuminate all of the aperture adjacent the student scanner.

Another feature of the present invention includes the incorporation of sockets within the end portions for facilitating the positioning of the scanners and for sealing out ambient light.

The method of the present invention includes programming the scanners as mentor and student by activating one scanner adjacent the first end portion and activating the other scanner adjacent the second end portion. Once the scanners have been configured as mentor and student, information is transmitted from the one scanner over a light beam. The light beam is converted into a plurality of point sources of light and the information is received and detected from one of the point sources of light by the student scanner.

It is accordingly an object of the present invention to provide an apparatus and method for transferring program instructions from one scanner to any number of scanners.

It is another object of the present invention to provide an apparatus for transferring program instructions from one scanner to any number of scanners which is lightweight and portable.

It is another object of the present invention to provide an apparatus and method for transferring program instructions from one scanner to any number of scanners which will configure the one scanner into a "mentor" scanner and the other scanners into "student" scanners.

It is another object of the present invention to provide an apparatus and method for transferring programming instructions from one scanner to any number of scanners which is independent of scanner orientation.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
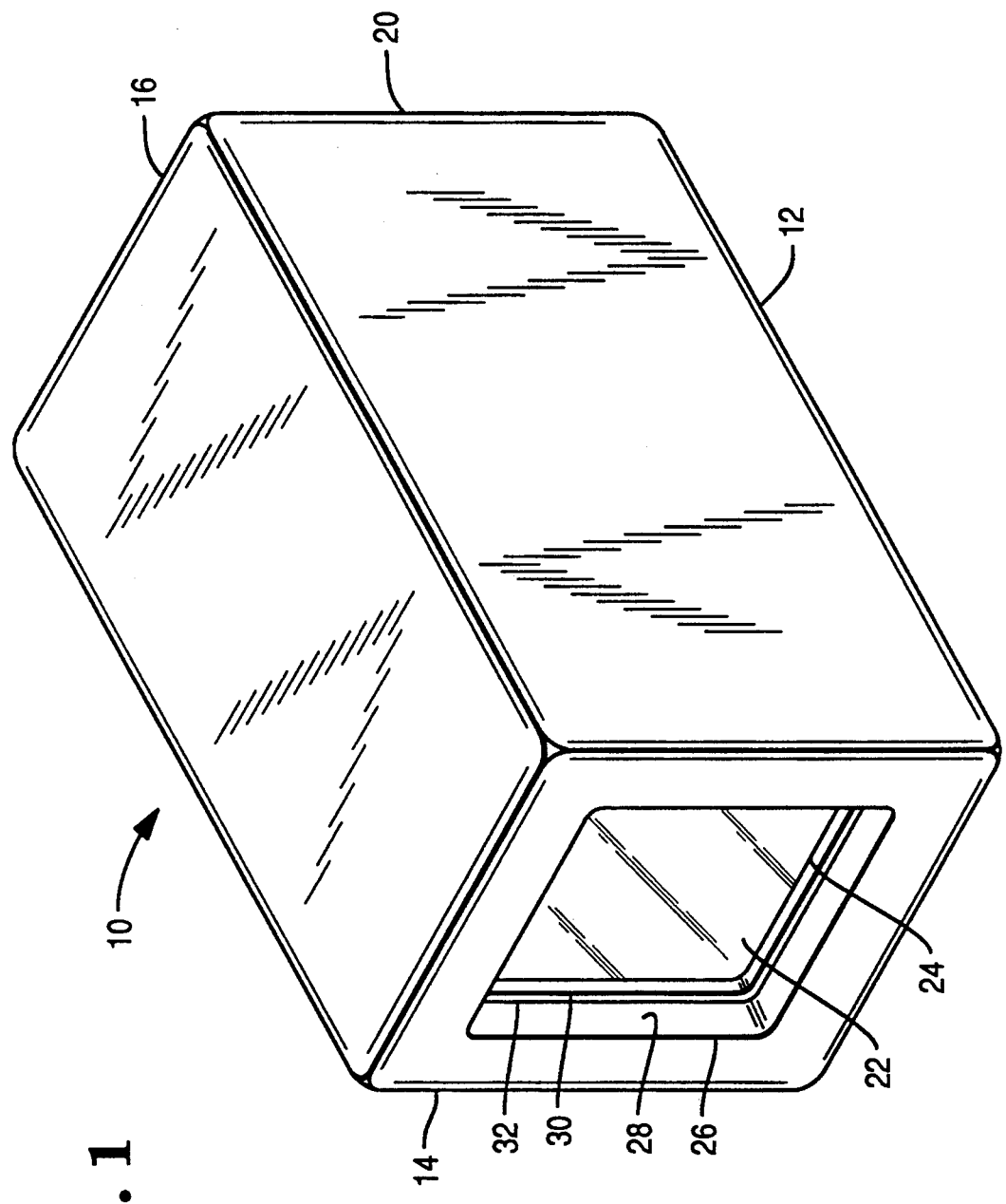
FIG. 1 is a view of the preferred embodiment of the programming apparatus of the present invention.

Turning now to FIG. 1, the preferred embodiment of the programming apparatus 10 of the present invention is shown. The programming apparatus 10 is preferably made of a lightweight opaque plastic by known methods. It has a box-like shape with a center portion 12 and left and right end portions 14 and 16. End surfaces 18 and 20 are identical and generally square in shape; however, other geometries are also envisioned. Looking at the left end portion 14, an aperture 22 extends therethrough and into the center portion 12, which is hollow. Glass 24 is a semi-transparent mirror for partially conducting and partially reflecting light from scanner 40, which also serves to separate each end portion from the center portion 12 and provides a mounting and reflecting surface for programming labels. The preferred embodiment is suited for use with the hand-held optical scanner disclosed in U.S. Pat. No. 4,971,410 to Wike, Jr. et al., which has been incorporated by reference.

In the preferred embodiment, the left and right end portions 14 and 16 are also equipped with a socket for receiving the hand-held scanners. For example, socket 26 of left end portion 14 is defined by an indented surface 28, which in this embodiment has four side walls, and which conforms to the outer shape of the face portion of the scanner to be inserted into the socket 26. Each socket also includes a detent 30 around the perimeter of the socket 26 at the inner edge 32 of the indented surface 28 against which the face portion of the scanner rests. The detent 30 serves to seal out ambient light from entering the apparatus 10.

Figure 2:
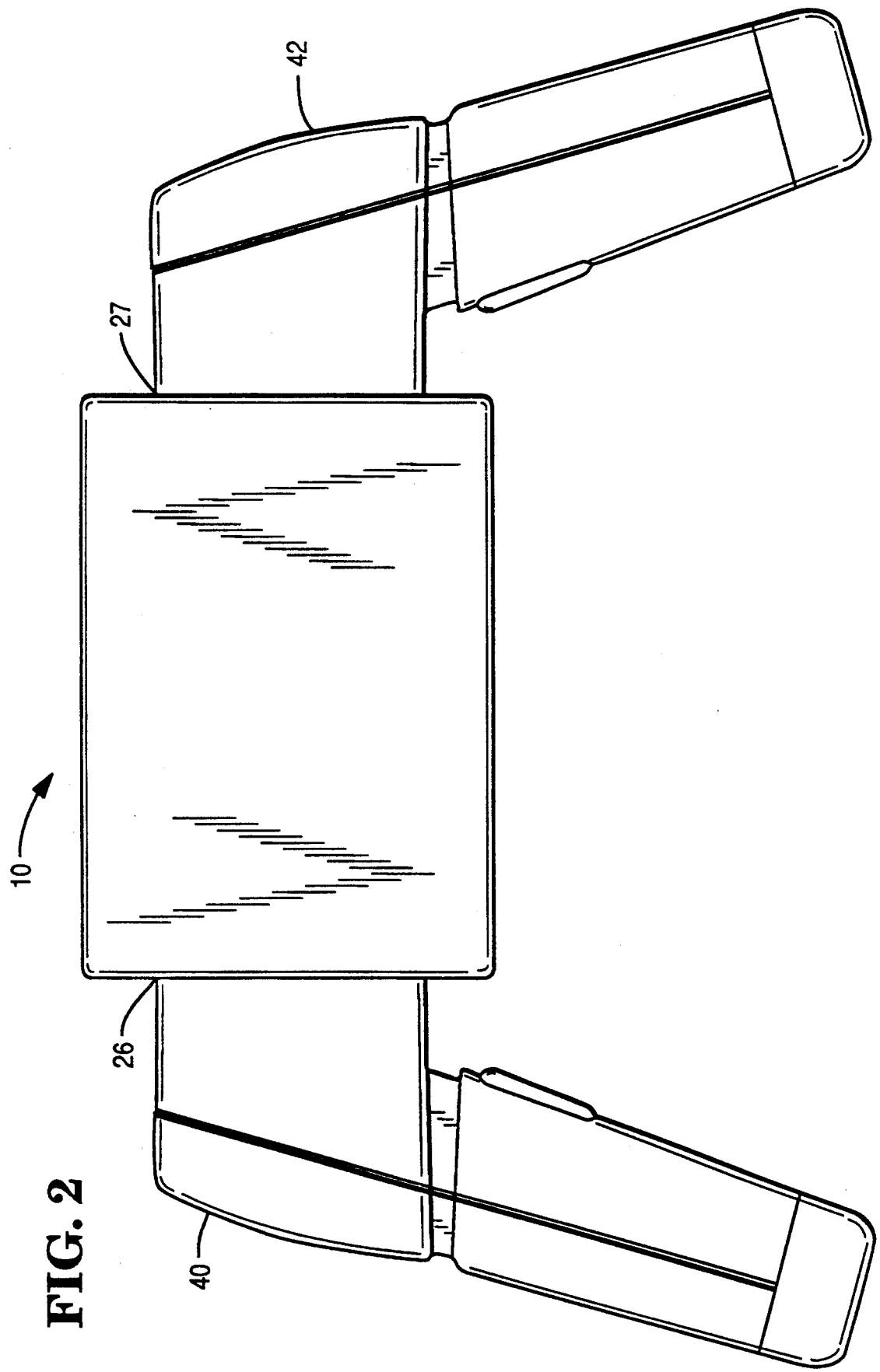
FIG. 2 is a profile view of the programming apparatus of the present invention with a hand-held mentor scanner and a hand-held student scanner in place.

Referring now to FIG. 2, the programming apparatus 10 is shown with scanners 40 and 42 in place in the sockets 26 and 27. Scanners 40 and 42 have identical components and operate using identical wavelengths of light; however, the programming apparatus 10 of the present invention transforms scanner 40 into a mentor scanner and scanner 42 into a student scanner. That is, scanner 40 contains programming to be transferred to scanner 42.

Figure 3:
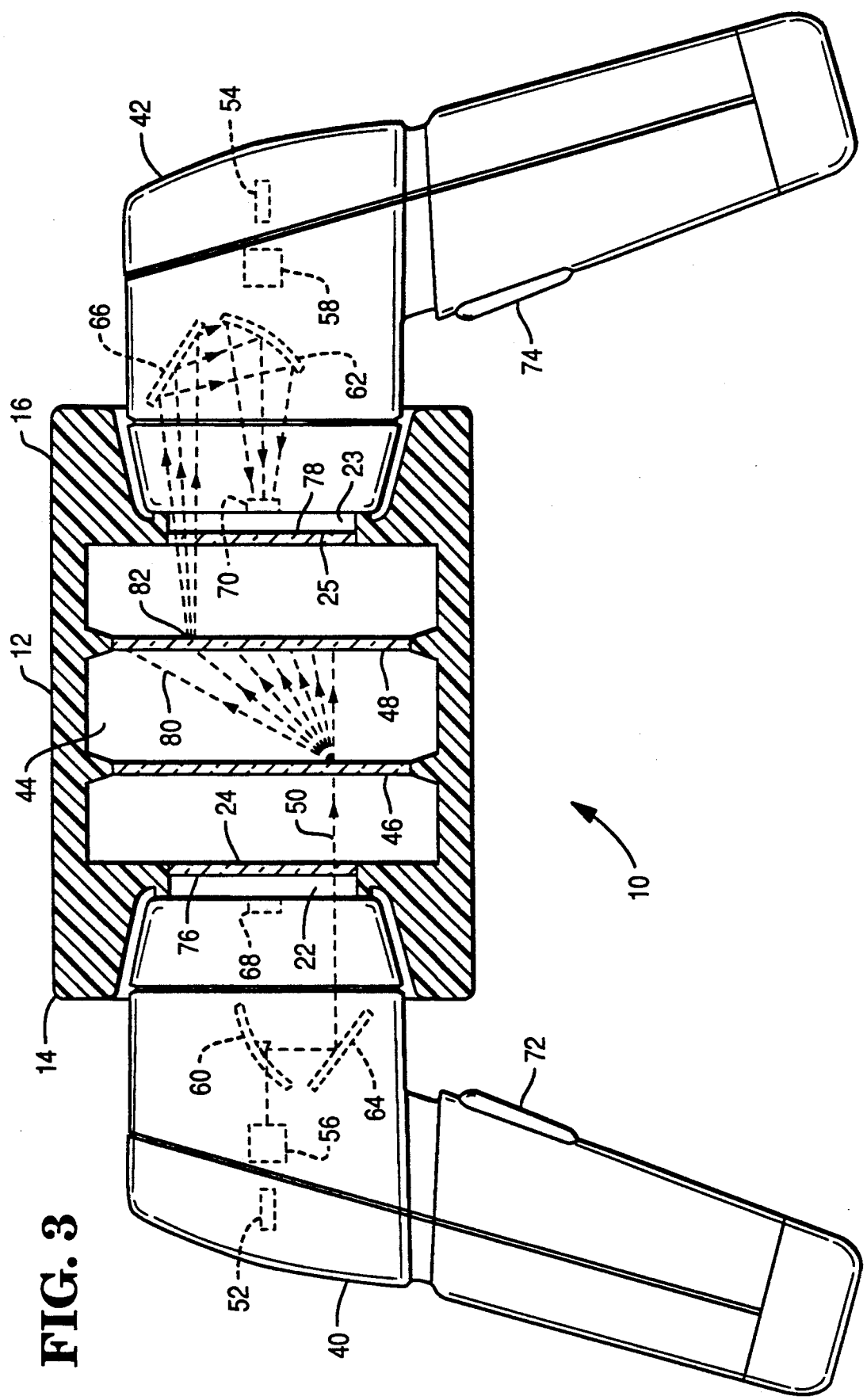
FIG. 3 is a cross-sectional view of the programming apparatus of the present invention with hand-held mentor and student scanners in place and in operation.

Referring now to FIG. 3, the center portion 12 of the programming apparatus 10 is shown in more detail. A cavity 44 is divided into three spaces by two vertical and parallel diffusion screens 46 and 48, which are perpendicular to the light beam 50 from scanner 40. In the preferred embodiment, the diffusion screens 46 and 48 are made of diffuser or smoked glass and are generally square in shape.

Also shown in FIG. 3 are some of the inner components of the scanners 40 and 42. The scanners 40 and 42 include lasers 52 and 54, motors 56 and 58 for rotating transceivers 60 and 62, a plurality of stationary mirrors 64 and 66 (only one of which is shown), and detectors 68 and 70. Triggers 72 and 74 activate the scanners 40 and 42 when engaged. The scanners 40 and 42 also employ microprocessors and sufficient firmware (not shown). These scanners are fully discussed in U.S. Pat. No. 4,971,410 to Wike, Jr.

The preferred embodiment of the present invention envisions the use of bar code labels for configuring optical scanners as mentor or student scanners, although switches may also be used. As shown in FIG. 3, a bar code label 76 is temporarily affixed to the outer surface of glass 24 of left end portion 14. Bar code label 76 deenergizes motor 56 and activates a modulation source within the microprocessor of scanner 40. Likewise, bar code label 78 is temporarily affixed to the outer surface of glass 25 of right end portion 16 and is read by scanner 42 to deenergize its motor 58 and laser 54. The use of bar code labels for changing the functions within an optical scanner is fully discussed in U.S. Pat. No. 4,868,375 to Blanford, which has been incorporated by reference.

In operation, when trigger 72 is briefly engaged, scanner 40 is energized, including laser 52 and motor 56. The laser beam 50 is reflected off the stationary mirror 64 towards the glass 24 of the left end portion 14. Scanner 40 scans the program label 76 and the return beam (not shown) from the glass 24 signals the motor 56 of the scanner 40 to stop rotating. It configures scanner 40 to transmit its information.

The trigger 74 of scanner 42 is also briefly engaged, thereby energizing its laser 54 and motor 58. Its beam (not shown) is sent towards the glass 25 of right end portion 16, where it also scans the gaps in the program label 78. The reflected beam (not shown) from the program label 78 puts the scanner 42 in a receive-only mode and deactivates its laser 54 and motor 58, but leaves its detector 70 operating.

When the motors 56 and 58 are deactivated, the optical transceivers 60 and 62 come to a stop in random positions. For clarity, the lowest stationary mirror 64 of scanner 40 is shown and the highest stationary mirror 66 of scanner 42 is shown.

Advantageously, the programming labels convert the optical scanner into a general purpose optical transceiver.

After the scanners 40 and 42 are configured as mentor and student, the program labels 76 and 78 are removed and both triggers 72 and 74 are engaged. The beam 50 from scanner 40 is modulated by an information signal generated by the microprocessor within the scanner 40. The modulated beam 50 passes through the glass 24 of the left end portion 14 into the cavity 44 of the center portion 12. A first diffusion screen 46 splits the beam 50 into multiple rays 80. These rays fan out and impact the second diffusion screen 48 which generates many point sources of light 82 for the scanner 42 to receive and detect. Thus, the entire aperture 23 of the right end portion 16 is illuminated no matter where the motors 56 and 58 stop. This feature advantageously makes in-line synchronization of the positions of the transceivers 60 and 62 of the two scanners 40 and 42 unnecessary.

The distance between the diffusion screens 46 and 48 is made wide enough to fully illuminate the aperture 23 of the right end portion 16 for various wavelengths of laser light.

Scanners 40 and 42 are keyed to automatically change back into ordinary scanners by the end of the transmission sequence from scanner 40.

Although the invention has been described with particular reference to certain preferred embodiments thereof, variations and modifications of the present invention can be effected within the spirit and scope of the following claims.

What is claimed is:

1. An apparatus for transferring information form one optical transceiver to another comprising:
   a housing having a center portion and first and second end portions to receive said optical transceivers, the center portion containing a cavity defined by an interior surface of the center portion, the first and second end portions containing apertures therethrough and into the cavity and defined by an interior surface of the end portions;
   means within the housing for converting light from said one optical transceiver into a form receivable by the other optical transceiver, regardless of the orientation of the other optical transceiver.

2. The apparatus as recited in claim 1, wherein the optical transceivers are programmable.

3. The apparatus as recited in claim 2, further comprising:
   means within the first and second end portions for programming the one optical transceiver adjacent the first end portion to transmit information to said other optical transceiver adjacent the second end portion and for programming the other optical transceiver to receive the information from the one optical transceiver.

4. The apparatus as recited in claim 3, wherein said programming means comprises:
  first transparent means within the aperture in the first end portion for partially conducting and partially reflecting a programming light beam from said one optical transceiver;
  a first outwardly facing program label mounted on the first transparent means;
  second transparent means within the aperture in the second end portion for partially conducting and partially reflecting a programming light beam from said other optical transceiver; and
  a second outwardly facing program label mounted on the second transparent means.

5. The apparatus as recited in claim 4, wherein said first and second program labels comprise bar code labels.

6. The apparatus as recited in claim 1, wherein the converting means comprises:
  means within the center portion for splitting a light beam containing information from said one optical transceiver into a plurality of point sources of light.

7. The apparatus as recited in claim 6, wherein the splitting means comprises:
  a plurality of diffusion screens arranged perpendicularly to the light beam from the one optical transceiver.

8. The apparatus as recited in claim 7, wherein said diffusion screens are made of diffuser glass.

9. The apparatus as recited in claim 7, wherein a first diffusion screen is operative to convert the light beam into a single point source of light generating a plurality of rays and a second diffusion screen is operative to convert the rays into a plurality of point sources of light.

10. The apparatus as recited in claim 7, wherein said diffusion screens are separated by a distance sufficient to provide point sources of light illuminating all of the aperture of the second end portion.

11. The apparatus as recited in claim 1, wherein said housing is opaque to ambient light.

12. The apparatus as recited in claim 1, wherein said housing is generally box-like in shape.

13. The apparatus as recited in claim 1, wherein said housing is made of plastic.

14. The apparatus as recited in claim 1, wherein the optical transceivers are optical scanners.

15. The apparatus in claim 1, further comprising:
  first socket means at the first end for receiving said one optical transceiver; and
  second socket means at the second end for receiving the other optical transceiver.

16. The apparatus as recited in claim 15, wherein said first and second socket means comprise:
  an indented surface having an inner edge terminating at the aperture and conforming to the shape of the optical transceiver; and
  means around the inner edge of the indented surface for sealing ambient light out of the aperture when the optical transceiver is inserted in the socket means.

17. An apparatus for transferring information from one programmable optical scanner to another programmable optical scanner comprising:
  a housing having a center portion and first and second end portions to receive said programmable optical scanners, the center portion containing a cavity defined by an interior surface of the center portion, the first and second end portions containing apertures therethrough and into the cavity and defined by an interior surface of the end portions, and said housing being opaque to ambient light;
  means within the first and second end portions for programming the one optical scanner adjacent the first end portion to transmit information to said other optical scanner adjacent the second end portion and for programming the other optical scanner to receive the information from the one optical scanner including a first transparent means within the aperture of the first end portion for partially conducting and partially reflecting a programming light beam from said one optical scanner, an outwardly facing program label mounted on the first transparent means, a second transparent means within the aperture of the second end portion for partially conducting and partially reflecting a programming light beam from said other optical scanner, and a second outwardly facing program label mounted on the second transparent means;
  means within the center portion for converting a light beam containing information from said one optical scanner into a plurality of point sources of light including first and second diffusion screens arranged perpendicularly to a light beam from the one optical scanner, the first diffusion screen being operative to convert the light beam into a single point source of light generating a plurality of rays and the second diffusion screen being operative to convert the rays into a plurality of point sources of light, said diffusion screens being separated by a distance sufficient to provide point sources of light illuminating all of the aperture of the second end portion; and
  first and second socket means in the first and second end portions for receiving said optical scanners, each socket means including an indented surface having an inner edge and conforming to the shape of the optical scanner, and sealing means around the inner edge of the indented surface and adjacent the interior surface for sealing ambient light out of the aperture when the optical scanner is inserted in the socket means.

18. The apparatus as recited in claim 17, wherein said first and second program labels comprise bar code labels.

19. The apparatus as recited in claim 17, wherein said diffusion screens are made of diffuser glass.

20. The apparatus as recited in claim 17, wherein the programming means are operative to convert the optical scanner into a general purpose optical transceiver.

21. A method for transferring information from one optical scanner to another optical scanner comprising:
  transmitting the information over a light beam from the one optical scanner;
  converting the light beam from said one optical scanner into a form receivable by the other optical scanner, regardless of the orientation of the other optical scanner; and
  detecting the converted light beam at the other optical scanner.

22. The method as recited in claim 21, wherein the optical scanners are programmable.

23. The method as recited in claim 22, further comprising the steps of
  programming the one optical scanner to transmit information to the other optical scanner; and programming the other optical scanner to receive information from the one optical scanner.

24. The method as recited in claim 23, wherein said step of programming the one optical scanner comprises the substeps of:
positioning a program label having program instructions for converting the one optical scanner into a transmitter on a transparent sheet of glass in front of said one optical scanner;
transmitting a light beam at said program label and sheet of glass;
receiving a reflected light beam from said program label and sheet of glass.

25. The method as recited in claim 24, further comprising the substeps of:
deenergizing a motor within the one optical scanner in response to program instruction received from the program label; and
removing the program label from the transparent sheet.

26. The method as recited in claim 23, wherein said step of programming the other optical scanner comprises the substeps of:
positioning a program label having program instructions for converting the other optical scanner into a receiver on a transparent sheet of glass in front of said other optical scanner;
transmitting a light beam at said program label and sheet of glass;
receiving a reflected light beam from said program label and sheet of glass.

27. The method as recited in claim 26, further comprising the substeps of:
deenergizing a motor within the other optical scanner in response to program instruction received from the program label;
deenergizing a laser within the other optical scanner in response to program instruction received from the program label; and
removing the program label from the transparent sheet.

28. The method as recited in claim 21, wherein said step of converting the light beam comprises the substeps of:
positioning a first diffusion screen across a path of the light beam, said first diffusion screen being operative to convert the light beam into a point source of light emitting a plurality of rays of light; and
positioning a second diffusion screen parallel to the first diffusion screen, said second diffusion screen being operative to convert the rays of light into a plurality of point sources of light.

29. The method as recited in claim 26, wherein the step of detecting comprises receiving one of the point sources of light.

* * * * *